March 5, 1957 J. P. SWIDER ET AL 2,784,028
AUTOMOBILE VISOR MOUNTING
Filed Dec. 22, 1954
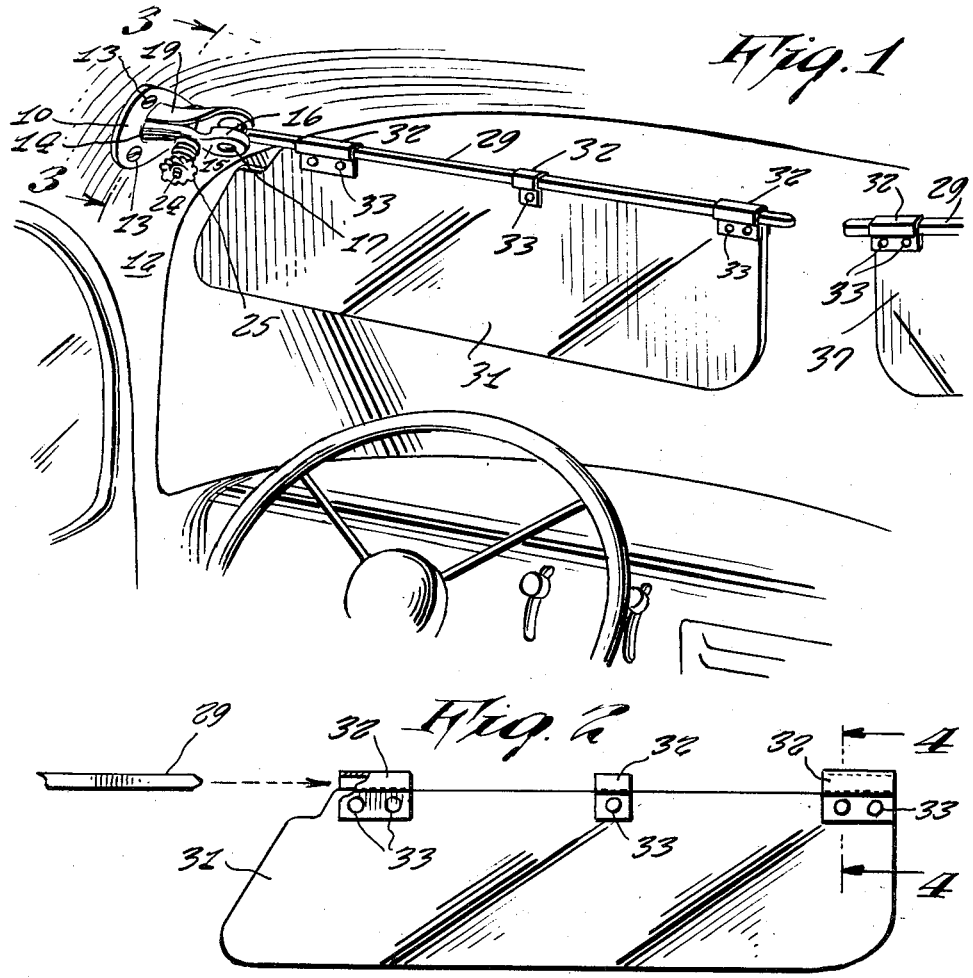
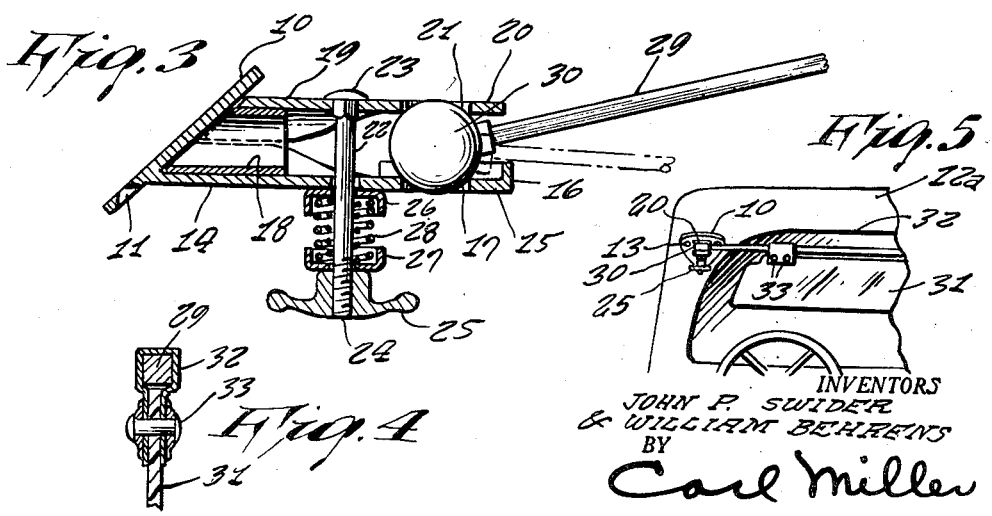
INVENTORS
JOHN P. SWIDER
& WILLIAM BEHRENS
BY
Carl Miller
ATTORNEY United States Patent Office 2,784,028
Patented Mar. 5, 1957

2,784,028

AUTOMOBILE VISOR MOUNTING

John P. Swider, Glendale, and William Behrens, Brooklyn, N. Y.

Application December 22, 1954, Serial No. 476,981

1 Claim. (Cl. 296—97)

This invention relates to visors for automobiles.

It is an object of the present invention to provide an improved visor for automobiles which may be used for both counteracting the glare of the sunlight during the day and automobile headlights at night from oncoming cars.

It is another object of the present invention to provide an automobile visor of the above type which includes universal joint mounting means which may be easily and readily locked by the driver or occupant to permit the adjustment of the visor to any one of an infinite number of positions to the convenience of the driver or occupant.

It is still another object of the present invention to provide an automobile visor of the above type wherein the visor portion may be easily and readily separated from the mounting bracket for purposes of cleaning the same or replacing it without having to remove the original mounting joint.

Other objects of the present invention are to provide an automobile visor of the above type having the above objects in mind which is of simple construction, inexpensive to manufacture, has a minimum number of parts, easy to use and efficient in operation.

For other objects and for a better understanding of the invention, reference may be had to the following detailed description taken in connection with the accompanying drawing, in which:

Figure 1 is a perspective view of a preferred embodiment of the present invention shown in operative use in a car;

Fig. 2 is a front elevational view thereof shown partly broken away of the visor and mounting brackets and showing the mounting bar in exploded relationship thereto;

Fig. 3 is a longitudinal sectional view of the mounting means taken along the line 3—3 of Fig. 1;

Fig. 4 is a vertical sectional view taken along the line 4—4 of Fig. 2; and

Fig. 5 is an interior elevational view of the invention shown installed at right angles to the visor in the front of the car.

Referring now more in detail to the drawing, 10 represents a mounting plate having countersunk openings 11 around its periphery whereby the same may be suitably secured to the side 12 of the car frame, for example by means of screws 13. The lower portion of the plate 10 is integrally formed with a lower, semi-cylindrical arm 14 which terminates in a circular enlargement 15 having a peripheral wall 16, the enlargement 15 having a circular opening 17 therethrough.

A tubular member 18 having an inclined inner end adapted to abut the adjacent face of the plate 10 is positioned within the sleeve or arm 14 (Fig. 3).

A complementary upper semi-cylindrical hollow sleeve or arm 19 separable from plate 10 and arm 14 is provided and is positioned on tubular member 18 above the arm 14. The upper sleeve 19 is integrally formed with an enlarged circular portion 20 overlying the enlarged circular portion 15 and having a central circular opening 21 of the same size as and aligned vertically with the opening 17.

The arms 14, 19 are secured together by the provision therein of aligned openings through which passes a bolt 22 having a head 23 engaging the arm 19 and a body portion which extends downwardly through the arm 14 a considerable distance to terminate in the externally threaded portion 24 onto which is screwed an internally threaded knob or handle 25. Cup shaped members 26, 27 are disposed on the bolt 22 intermediate the arm 14 and handle 25 and contain a spring 28 sleeving the bolt (Fig. 3). Thus, the arms 14 and 19 will be urged into engagement with each other about the tubular member 18 upon tightening the handle 25 under the action of the spring 28, which spring permits the necessary expansion of the same against shock to the visor as will hereinafter become clear.

An elongated mounting rod of square cross section 29 fixedly carries at one end thereof an enlarged ball 30 positioned intermediate the plates 15, 20 and extending outwardly through the openings 17, 21 in a universal joint. Thus, the visor and the ball 30 may be rotated to any position between the plates 15, 20 in all directions and remain in any position as desired.

A visor 31 of plastic "Plexiglas" and adapted to eliminate glare from either the sunlight or the headlights of oncoming cars at night is provided along its upper edge with the rectangular brackets 32 secured thereon by rivets 33 or the like, the brackets 32 being adapted to receive therethrough the mounting bar 29 (Fig. 4). Thus, the visor 31 may be easily and readily removed from the mounting bar 29 to wash the same or to replace it by a new visor without the necessity of dismounting the plate 10 or the mounting bar 29.

As shown in Fig. 1, a pair of visors 31 may be mounted on opposite sides of the car for both the driver and the front seat passenger, identical devices being employed on opposite sides.

Also, as shown in Fig. 5, the plate 10 may be mounted on the front frame 12a of the car with the arms 14, 19 disposed at substantially right angles to the mounting rods 29. Also, the angulation between the plate 10 and the arms 14, 19 may be varied to fit the requirements.

While various changes may be made in the detail construction, it shall be understood that such changes shall be within the spirit and scope of the present invention as defined by the appended claim.

Having thus set forth and disclosed the nature of our invention, what is claimed is:

A sun visor comprising an elongated mounting rod of substantially rectangular cross section, an inner tubular element, a hollow semicylindrical sleeve disposed across the bottom of said tubular element extending therebeyond and terminating in a substantially circular enlarged flat portion having a central circular opening, a second sleeve substantially cylindrical disposed across the upper side of said tubular element coextensive with said first semicylindrical member and including a laterally enlarged portion having a substantially circular central opening overlying said first circular opening, a spherical enlargement carried at one end of said mounting rod and positioned intermediate said circular openings, a bolt piercing said semicylindrical members beyond said tubular element and extending downwardly therethrough, an externally threaded portion at the end of said bolt, an internally threaded handle on said externally threaded portion, a pair of oppositely disposed cup-shaped members on said bolt intermediate said handle and semicylindrical member, a coil spring sleeving said bolt intermediate said cup-shaped members, a plate integrally formed at one end at one of said semicylindrical portions, said plate having countersunk mounting openings for securement to the interior of a car, a visor adapted to eliminate glare from sun and headlights, and a plurality of longitudinally spaced hollow brackets secured to one end of said visor and adapted to slidably receive therethrough said mounting bar.

References Cited in the file of this patent

UNITED STATES PATENTS

| | | |
|---|---|---|
| 855,149 | Vaughn et al. | May 28, 1907 |
| 1,477,312 | Caskey | Dec. 11, 1923 |
| 1,674,538 | Williams | June 19, 1928 |
| 1,739,177 | Nicholas | Dec. 10, 1929 |
| 1,797,458 | Westling | Mar. 24, 1931 |

FOREIGN PATENTS

| | | |
|---|---|---|
| 633,398 | Great Britain | Dec. 13, 1949 |